3,530,375
AIRCRAFT MAGNETOMETER SYSTEM WITH MEANS TO COMPENSATE SAID SYSTEM FOR DISTURBING MAGNETIC FIELD GENERATED BY THE AIRCRAFT
Fransiscus A. Passier, Dorion, Quebec, Canada, assignor, by mesne assignments, to the United States of America as represented by the Secretary of the Navy
Filed Oct. 22, 1968, Ser. No. 769,670
Int. Cl. G01v 3/16
U.S. Cl. 324—4  4 Claims

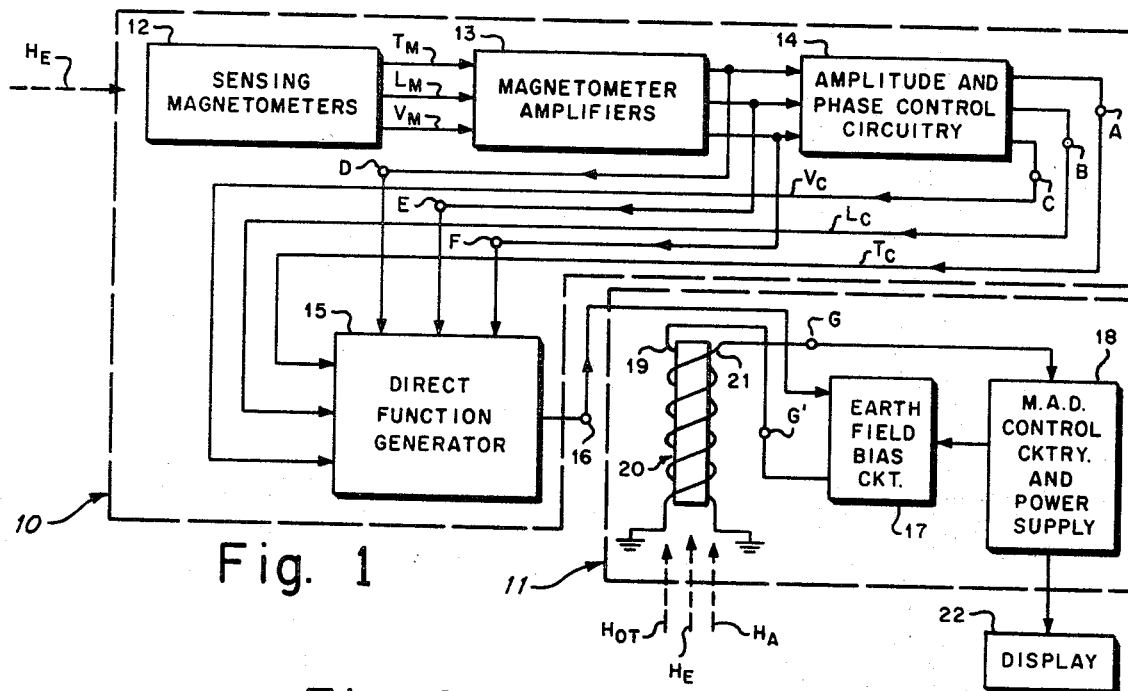
Fig. 1
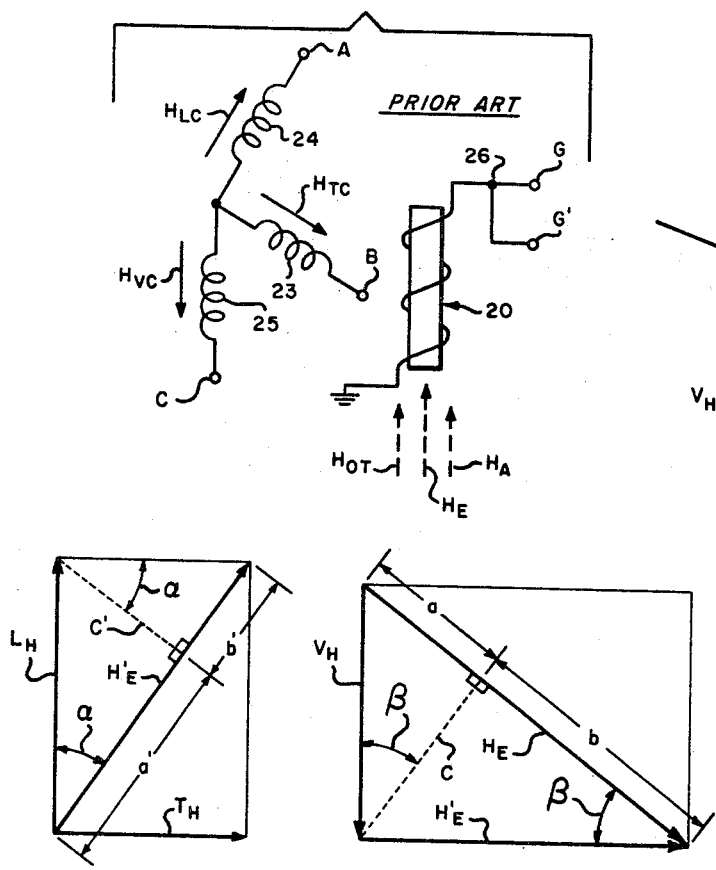
Fig. 2 PRIOR ART
Fig. 4b
Fig. 4c
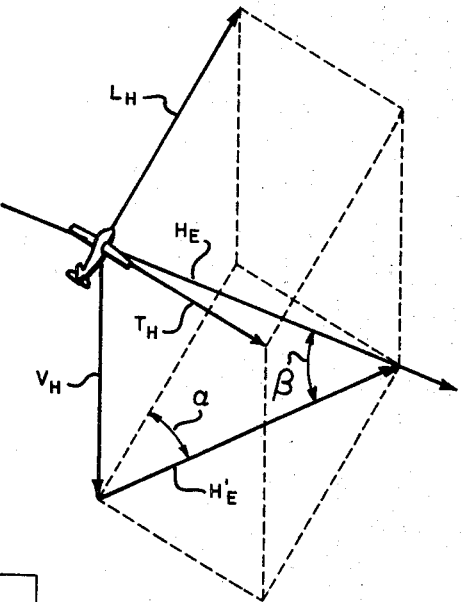
Fig. 4a
INVENTOR.
FRANSISCUS A. PASSIER
ATTORNEY United States Patent Office 3,530,375
Patented Sept. 22, 1970

ABSTRACT OF THE DISCLOSURE

A magnetometer compensation system receiving a first orthogonal set of signals representative of the earth's magnetic field and a second set of orthogonal signals representative of the disturbing magnetic field generated by the aircraft as it maneuvers in the earth's field for electrically providing a single compensating signal for direct electrical injection into an airborne MAD equipment. The system includes two reversible, null seeking servo motors each respectively driving like pluralities of sine/cosine potentiometers, selected potentiometers receiving the first orthogonal signal set and other potentiometers receiving the second orthogonal signal set. The potentiometers which receive the first signal set provide positional input signals to the servo motors.

BACKGROUND OF THE INVENTION

This invention relates to a system for electrically injecting a single compensation signal directly into the pickup coil or head of an airborne magnetic anomaly detector (MAD) equipment. More particularly, the invention relates to a direct function generator system which is utilized in combination with existing MAD equipment and field compensation equipment to convert three mutually orthogonal compensating signals into a single composite electrical signal for direct electrical injection into the MAD head.

MAD techniques have been employed for a considerable time to sense and/or display the earth's magnetic field and magnetic anomalies appearing therein. In general, it is the magnetic anomalies that are of interest. Airborne MAD and compensation equipment generally is suscepted to three separate magnetic fields. These fields are the earth's magnetic field, the magnetic field generated by the aircraft which houses the MAD and compensation equipment, and the magnetic field or anomaly generated by an object target, the detection of which is desired. The relative strengths of these fields differ considerably, the field strengths being on the order of 50,000 gammas, 100 gammas and 0.10 gamma for the earth, aircraft, and object target, respectively. Accordingly, to isolate the field or magnetic anomaly generated by an object target it has become necessary to compensate or balance out both the earth's magnetic field and the field generated by the aircraft.

The earth's magnetic field has been successfully balanced out by supplying a current to the MAD head, the current generating therein a magnetic field of equal amplitude and opposite phase relationship to the earth's magnetic field, and by utilizing positioning servos which maintain the MAD head parallel to the earth's field at all times regardless of the relative orientation of the aircraft in space.

The field generated by the aircraft is not so easily nullified, however. The nature of this field is relatively complex comprising a "perm" field due to the permanently magnetized members in the aircraft, an induced field in soft ferromagnetic aircraft members, and an eddy current field caused by large conducting sheets such as the wings of the aircraft. All of these fields are generated as the aircraft maneuvers in the magnetic field of the earth as changes in attitude of the aircraft result in changes in both the relative orientation of the magnetometer elements within the compensating equipment and the various magnetic members in the aircraft structure. The maneuvering of the aircraft thus causes spurious signals to appear at the MAD head.

To balance out these spurious signals various compensation systems have been utilized. One such system employs the use of three course or gross effect mutually orthogonal sensing magnetometers which sense the earth's magnetic field and convert it into mutually orthogonal electrical signals. These signals are then operated upon by suitable control circuitry to provide compensating signals representative of the aircraft field whereupon they are converted to magnetic signals by a set of three mutually orthogonal compensation coils. The last mentioned mutually orthogonal coils are magnetically coupled to the MAD head and induce compensating signals therein to balance out aircraft field signals.

One of the problems inherent with the above-mentioned system is the destructive interference caused by the presence of magnetic and ferromagnetic equipments within the aircraft and within close proximity with the mutually orthogonal magnetically radiating compensation coils. The compensating field coils must be in close proximity with the magnetometers due to the space limitations within the aircraft, and the relative strengths and positions of the compensating fields. This hinders the capability of the MAD system, impairs aerodynamic stability and often results in erroneous signal (false object target) information being produced.

It is therefore desirable to provide a compensating signal to the MAD detecting head which is electrically rather than magnetically coupled therewith such that the aforementioned coupled problems are eliminated. It is further desirable that the equipment for producing such an electronic compensation signal be both of relatively small size and independent of position within the aircraft.

SUMMARY OF THE INVENTION

Accordingly, it is the general purpose of the present invention to provide a direct function generator system for use with existing compensation equipment adapted to receive electrical information therefrom and provide a single, direct, electrically linked compensating signal to the MAD detecting head of the MAD system.

The direct function generator comprises two electrical channels each of which includes a reversible position servo which drives like pluralities of sine/cosine potentiometers, selected potentiometers receiving electrical signals representative of the earth's magnetic field and other selected potentiometers receiving compensating signals produced by the compensation system. The earth's magnetic field signals are utilized to generate, respectively, the positional angles α and β, where β is the angle between the earth magnetic field vector and the plane containing the aircraft's longitudinal and transverse axes and α is the angle between the aircraft's longitudinal axis and the projection of the earth magnetic field vector on the plane through the aircraft's longitudinal and transverse axes. Once these angles are generated, the aircraft compensation signals are trigonometrically combined by selected sine/cosine potentiometers to provide a single composite compensating signal. This signal is electrically fed to the MAD head through a coil provided therearound to balance out sensed aircraft magnetic fields. Due to this direct electrical connection, both the need for the three orthogonal, compensating coils utilized heretofore and the problems generated by the magnetic coupling between the compensation and MAD systems are eliminated.

BRIEF DESCRIPTION OF THE DRAWING

FIG. 1 is a block diagram of the compensation equipment and MAD equipment showing the direct function generator and the interconnections therewith;

FIG. 2 is a partial schematic diagram of the prior art showing the terminals wherein the mutually orthogonal compensation coils and the MAD head were connected in the system of FIG. 1;

FIG. 4a is an exemplementary diagram of the earth's magnetic field with respect to the longitudinal, transverse, and vertical axes of the aircraft housing the equipments of FIG. 1;

FIG. 4b is a diagram of the plane defined by the longitudinal and transverse axis of FIG. 4a; and FIG. 4c is a diagram of the plane defined by the vertical axis and projection of the earth's field vector on the longitudinal and transverse plane of FIG. 4b.

DESCRIPTION OF THE PREFERRED EMBODIMENT

Figure 3:
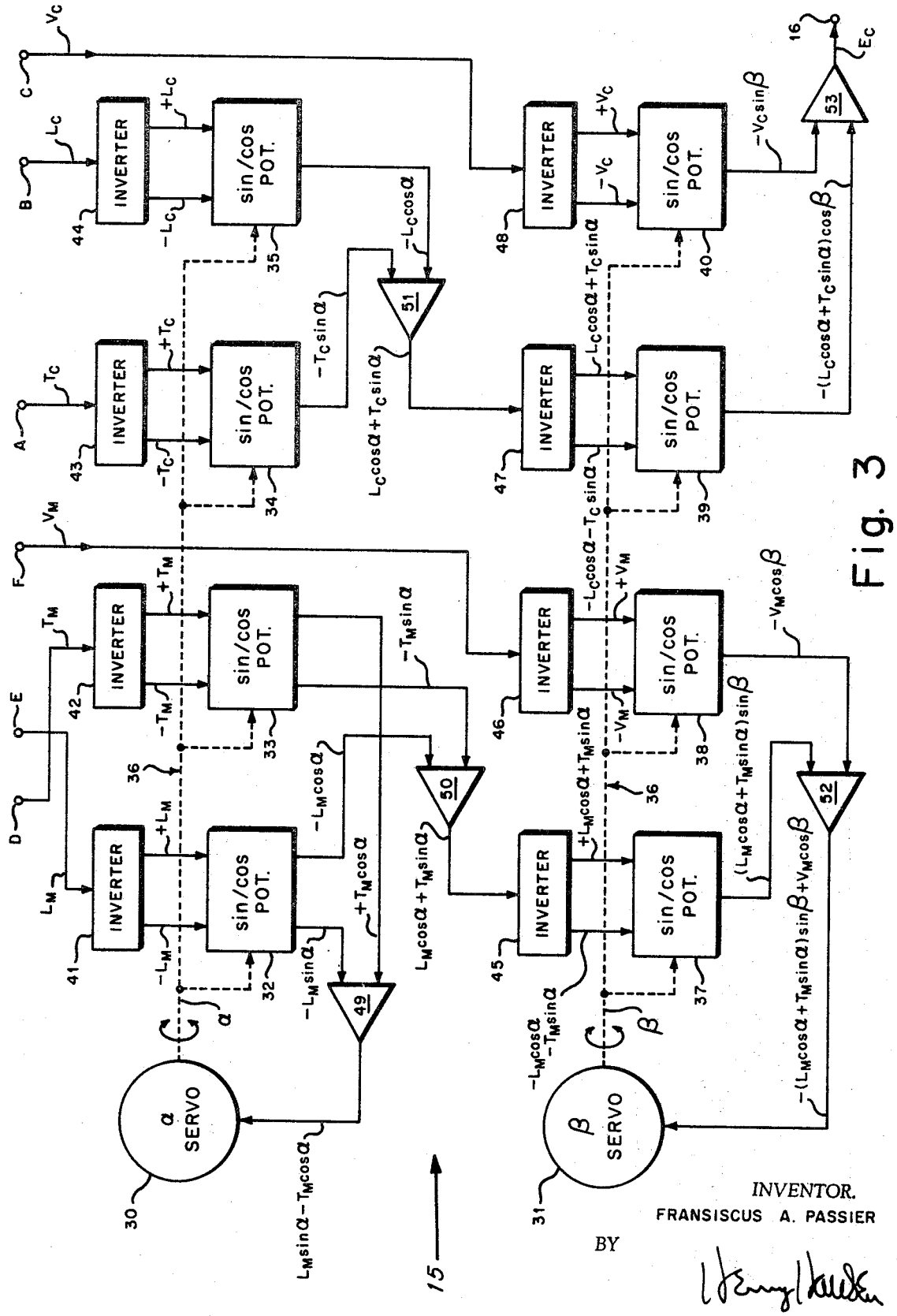
FIG. 3 is a block diagram of the direct function generator in accordance with the invention.

Referring now to the drawing and more particularly to FIG. 1 there is shown a compensation system 10 and a MAD system 11. The compensation system 10 includes three mutually orthogonal sensing magnetometers 12 which continually sense the earth's magnetic field, $H_E$. The sensing magnetometers 12 are of the gross effect type and accordingly sense only large fields such as that of the earth (i.e., on the order of 50,000 gammas). Lesser fields such as that generated by the maneuvering of the aircraft in the earth's field and that generated by the object target are not detected. Upon sensing $H_E$, the magnetometers 12 convert it into three electrical signals $T_M$, $L_M$, and $V_M$, respectively. These electrical signals are respectively representative of the component of $H_E$ along the transverse, longitudinal, and vertical axes of the aircraft. These signals are amplified by individual magnetometer amplifiers 13 and fed to suitable amplitude and phase control circuitry 14 wherein the earth's magnetic field signals are converted into aircraft compensation signals $T_C$, $L_C$, and $V_C$ in a manner well known in the art. Thus the signals $T_C$, $L_C$, and $V_C$ emanating respectively from the terminals A, B and C of amplitude and phase control circuitry 14 are equal in magnitude but opposite in phase to the magnetic field of the aircraft along the transverse, longitudinal and vertical axes thereof, respectively, these signals having been derived from the earth's magnetic field, $H_E$.

In practice, this is accomplished by flying a dry run over the area wherein it is believed an object target may be present and by utilizing auxiliary apparatus (not shown) to sense and record the magnetic field of the aircraft. Once this information has been attained, suitable potentiometers and/or variable phase shifters within amplitude and phase control circuitry 14 are positioned to provide compensating signals equal in magnitude but opposite in phase thereto in response to received, orthogonal magnetic earth field signals when the aircraft flies the same flight pattern as during the dry run.

The thus compensated signals $T_C$, $L_C$, and $V_C$ are supplied as input signals respectively from the terminals C, B, and A to a direct function generator 15. Generator 15 additionally receives signals from point D, E, and F at the output of the magnetometer amplifiers 13. The signals from points D, E, and F represent, respectively, the amplified electrical signals $T_M$, $L_M$, and $V_M$, the orthogonal components of the earth's magnetic field.

The direct function generator 15 operates upon both sets of signals, (i.e., the orthogonal signals representative of the earth's magnetic field and the orthogonal compensation signals representative of the aircraft's magnetic field) in a manner to be hereinafter described and provides a single output signal at point 16, this signal being the vector sum of the compensating signals at any instant of time.

The signal from point 16 is directly and electrically injected into the MAD system 11. More particularly, this signal is fed to the earth field bias circuit 17. This circuit 17 is connected with the MAD control and power supply circuitry 18 and receives its power therefrom. Additionally, the bias circuit 17 is connected at its output G' to a coil 19 wound around a MAD head 20. The head 20 also has wound therearound a second coil 21. Coil 21 is connected to an input terminal of the MAD control circuitry 18. Both coils 19 and 21 are grounded and are magnetically and electrically insulated from one another by suitable shielding. MAD control and power supply circuitry 18 is connected to a suitable display or recorder or the like for presentation of the signal anomaly. MAD head 20 is a very sensitive magnetometer capable of sensing faint magnetic fields. It is positioned at all times parallel to the earth's magnetic field $H_E$ by appropriate servo means (not shown) regardless of the relative orientation of the aircraft.

Due to the fact that head 20 is sensitive enough to pick up magnetic anomalies generated from object targets, it would be saturated by the comparatively strong fields $H_E$ and $H_A$ generated by the earth and the maneuvering aircraft, respectively. Accordingly, these fields must be balanced out or compensated for. Earth field bias circuit 17 provides a current generated therewithin which, as it flows through coil 19, generates a magnetic field which penetrates the head 20. The field thus generated is of equal magnitude and opposite phase relation to the earth's magnetic field $H_E$. In addition, earth field bias circuit 17 provides a second current through the same coil 19, this current generating a field equal in magnitude and opposite in phase to the magnetic field generated by the aircraft. This second current is the current derived from the direct function generator 15. Thus the MAD head 20 has compensated therewithin the magnetic fields produced both by the earth and by the maneuvering aircraft. The result is that the MAD head 20 senses only the magnetic field $H_{OT}$ generated by the object target. This field induces a current in coil 20 which is fed through point G and therefrom to MAD control circuitry 18. This signal is then operated upon by the various circuitry within MAD control circuitry 18 to provide the desired magnetic anomaly output information to the display 22.

Having thus described the present overall system and the operation thereof, reference is now made to FIG. 2 wherein the mode of operation as heretofore effectuated will be explained. In FIG. 2 there is shown three mutually orthogonal coils 23, 24, and 25, respectively. Heretofore, these coils were connected in the system in FIG. 1 at the points A, B, and C in lieu of direct function generator 15. These coils provide orthogonal magnetic fields which are equal in magnitude but opposite in phase to the magnetic fields of the aircraft. Thus, the field $H_{TC}$, the magnetic field generated by coil 23, is representative of the compensated transverse field. In like manner, $H_{LC}$ is the compensated magnetic longitudinal field generated by coil 24 and $H_{VC}$ is the compensated vertical field generated by coil 25. Also shown in FIG. 2 is the MAD head 20 having, in this case, but a single coil 21 therearound. The output terminal G' of the earth field bias circuit 17 is tied to a point 26 on the coil 21.

In operation, the coils 23–25, inclusive, are magnetically coupled to the MAD head 20 and accordingly, balance out the aircraft field sensed thereby. Additionally, earth field bias circuit 17 provides a current from its output terminal G' which, in this case, is passed through coil 21 to induce in the MAD head 20 a magnetic field equal in magnitude but opposite in phase to $H_E$. Thus, the head 20 in effect receives only $H_{OT}$, the field generated by the object target. This field induces a current in coil 21 which is fed therefrom through point G to the MAD control circuitry 18 as disclosed heretofore. Suitable circuitry within earth field bias circuit 17 prevents the current representative of the signal anomaly from flowing therein. It is to be noted, however, that within the aircraft, the distance between the coils 23–25, inclusive, and the MAD head 20 may vary from 38 inches to 19 feet depending upon weight balance considerations, aerodynamic stability, space, and trial and error placements to minimize the destructive interference from other magnetic aircraft members.

Referring now to FIG. 3, the direct function generator 15 will be described in detail. Direct function generator 15 comprises two channels, each channel including, respectively, a reversible, null-seeking servo motor 30 and 31. Servo motor 30 drives a plurality of sine/cosine potentiometers 32, 33, 34, and 35 through appropriate mechanical linkage 36. Similarly, servo motor 31 drives a like plurality of sine/cosine potentiometers 37, 38, 39, and 40 through like mechanical linkage 36.

Sine/cosine potentiometers are well known in the art and are capable of providing four output voltages proportional to $E \cos \theta$, $E \sin \theta$, and $-E \cos \theta$, and $-E \sin \theta$, where $\pm E$ are the voltages applied to the potentiometer and $\theta$ is the angle of rotation thereof. A sine/cosine potentiometer of this type is well described in the text, "Pulse and Digital Circuits" by Millman and Taub, McGraw-Hill Company, 1956, p. 498.

An inverter 41 is connected to sine/cosine potentiometer 32 and provides plus and minus voltages thereto. In like manner, inverters 42, 43, 44, 45, 46, 47, and 48 provide plus and minus input voltage signals to, respectively, sine/cosine potentiometers 33, 34, 35, 36, 37, 38, 39, and 40. Inverters 41, 42, and 46 respectively receive the orthogonal signals $L_M$, $T_M$, and $V_M$, representative of the earth's magnetic field $H_E$. The inverters 43, 44, and 48 respectively receive the orthogonal signals $T_C$, $L_C$, and $V_C$, representative of the compensated field of the maneuvering aircraft. Inverters 45 and 47 receive signals derived from the direct function generator 15 in a manner to be hereinafter described.

Sine/cosine potentiometers 32 and 33 are each electrically connected at the utilized outputs thereof to summing amplifiers 49 and 50. The output of summing amplifier 49 is connected to provide a control signal to servo motor 30, while the output of summing amplifier 50 is connected to inverter 45. The utilized outputs of potentiometers 34 and 35 are connected to summing amplifier 51, the amplifier providing an output signal to inverter 47. The utilized outputs from potentiometers 37 and 38 are electrically connected to a summing amplifier 52, this amplifier having its output connected to provide a control signal to the servo motor 31. Summing amplifiers 50, 51, and 52 have unity gain characteristics such that the amplitude of each component of the output signal produced thereby is identical with that of the input signal, the sign thereof being changed due to the phase reversal inherent with the amplifier. Sine/cosine potentiometers 39 and 40 provide electrical output signals to a summing amplifier 53, this amplifier providing an output signal at point 16 to the earth field bias circuit 17. Amplifier 53 may have proper circuitry associated therewith (or may have its gain set) such that amplitude scaling is achieved, if necessary, in order that the output may be corrected for direct injection into earth field bias circuit 17.

The operation of the direct function generator 15 of FIG. 3 will now be described in conjunction with FIGS. 4a, 4b and 4c. As noted heretofore, direct function generator 15 provides a single aircraft magnetic field compensating signal suitable for direct electrical injection into the MAD equipment 11. This is the signal or output voltage $E_C$ at point 16, FIG. 3. $E_C$ has the following form:

(1) $\quad E_C = V_C \sin \beta + (L_C \cos \alpha + T_C \sin \alpha) \cos \beta$ where, $$\tan \alpha = \frac{T_M}{L_M}$$

$$\tan \beta = \frac{V_M}{\sqrt{T_M^2 + L_M^2}}$$

$\alpha$=the angle between the aircraft's longitudinal axis and the projection of the earth field vector on the plane through the aircraft's longitudinal and transverse axes. (In straight and level flight the angle $\alpha$ represents the earth's magnetic heading), and $\beta$=the angle between the earth's magnetic field vector and the plane containing the aircraft's longitudinal and transverse axes. (In straight and level flight the angle $\beta$ represents the dip angle.)

Equation 1 may be derived graphically from FIGS. 4a–4c. From FIG. 4b it is seen that, (2) $\qquad H'_E = a' + b'$ where, $a' = L_H \cos \alpha$ and $b' = T_H \sin \alpha$ Therefore, (3) $\qquad H'_E = L_H \cos \alpha + T_H \sin \alpha$ From FIG. 4c it is seen that, (4) $\qquad H_E = a + b$ where, $a = V_H \sin \beta$ and $b = H'_E \cos \beta$ Substituting for $H'_E$ from Eq. 3, Eq. 4 becomes Eq. 1, to wit:

(1) $\quad H_E = V_H \sin \beta + (L_H \cos \alpha + T_H \sin \alpha) \cos \beta$ Since $\alpha$ and $\beta$ vary as the aircraft maneuvers, it is desirable to obtain equations defining their variations. From FIG. 4b it is seen that, (5) $\qquad c' = L_H \sin \alpha = T_H \cos \alpha$ Therefore, (6) $\qquad L_H \sin \alpha - T_H \cos \alpha = 0$ Similarly, from FIG. 4c, (7) $\qquad c = V_H \cos \beta = H'_E \sin \beta$ Therefore, (8) $\qquad V_H \cos \beta - H'_E \sin \beta = 0$ Substituting for $H'_E$ from Eq. 3, Eq. 8 becomes, (9) $\quad V_H \cos \beta - (L_H \cos \alpha + T_H \sin \alpha) \sin \beta = 0$ Thus Eqs. 6 and 9 yield earth field angular positional information as a function of $\alpha$ and $\beta$ while Eq. 1 indicates that the earth's magnetic field may be represented as a single function expressive of those angles and having transverse, longitudinal, and vertical components.

However, since it is desired to provide a single function representative of the compensated magnetic field of the aircraft, and further since the amplitude and phase control circuitry 14 of the compensation equipment 10 transforms the orthogonal earth field signals into orthogonal, compensated aircraft field signals, the direct function generator 15 receives both the orthogonal earth field signals and the orthogonal aircraft field signals, the former being utilized to formulate Eqs. 6 and 9 and the latter being utilized to formulate Eq. 1. This is accomplished in the following manner. The orthogonal magnetometer voltages $T_M$, $L_M$, and $V_M$ are applied respectively from terminals D, E, and F to inverters 41, 42, and 46. Inverters 41 and 42 provide respectively the voltages $\pm L_M$ and $\pm T_M$ to respective sine/cosine potentiometers 32 and 33. As noted heretofore, potentiometers such as these have four possible outputs. Only certain particular outputs are selected here, the others being left open. Accordingly, the voltages $-L_M$ sin α and $-L_M$ cos α are taken from potentiometer 32 while the voltages $-T_M$ sin α and $+T_M$ cos α are taken from potentiometer 33. The voltages $-L_M$ sin α and $+T_M$ cos α are fed into and summed by summing amplifier 49 which, due to its phase shift characteristic, changes the sign of the voltages such that the signal applied to servo motor 30 is of the form $+L_M$ sin α$-T_M$ cos α. It is to be noted that this input signal to servo motor 30 comprises the left-hand side of Eq. 6 above.

Amplifier 50 receives, sums, and inverts the sign of the voltages $-L_M$ cos α and $-T_M$ sin α to provide to the inverter 45 the voltage $L_M$ cos α$+T_M$ sin α. The inverter 46 receives the voltage $+V_M$ and provides the voltages $\pm V_M$ to sine/cosine potentiometer 38. Similarly, sine/cosine potentiometer 37 receives from inverter 45 the voltages $\pm(L_M$ cos α$+T_M$ sin α$)$. Selected output voltages from potentiometers 37 and 38, namely, $(L_M$ cos α$+T_M$ sin α$)$ sin β and $-V_M$ cos β are fed to amplifier 52 which sums these voltages and inverts the respective signs thereof to yield the voltage $$-(L_M \cos α + T_M \sin α) \sin β + V_M \cos β$$

This signal is fed to servo motor 31. It is to be noted that the input signal to servo 31 is the left-hand side of Eq. 9 above.

Servo motor 30 may be termed the alpha (α) servo while servo motor 31 may be termed the beta (β) servo. Each of these servos receive input electrical signals of the form derived above and as shown by Eq. 6 and Eq. 9, respectively, and provide a mechanical output which, through linkage 36, is utilized to continually drive and rotate the respective sets of potentiometers 32–35, inclusive, and 37–40, inclusive. Since these servo motors are both null seeking they will continue to provide an output indicative of their received electrical input signals until a null or zero is reached. Thus, when $$L_M \sin α - T_M \cos α = \text{zero}$$

alpha (α) servo 30 stops and the potentiometer shafts associated with sine/cosine potentiometers 32–35, inclusive, have taken the angular position α, Eq. 6 being satisfied. Similarly, when $$-(L_M \cos α + T_M \sin α) \sin β + V_M \cos β = \text{zero}$$

the beta (β) servo 31 stops and the potentiometer shafts of sine/cosine potentiometers 37–40, inclusive, have taken the angular position β.

Having achieved the angles alpha (α) and beta (β), transforming the three orthogonal aircraft compensating signals $T_C$, $L_C$, and $V_C$ is achieved upon taking these voltages from the points A, B, and C, respectively, and respectively feeding them to inverters 43, 44, and 48 wherefrom the voltages $\pm T_C$, $\pm L_C$, and $\pm V_C$ are respectively taken. Amplifier 51 provides the voltage $L_C$ cos α$+T_C$ sin α, this amplifier having received the voltages $-T_C$ sin α and $-L_C$ cos α from sine/cosine potentiometers 34 and 35, respectively. Inverter 47 inverts the voltages from amplifier 51 to supply to potentiometer 39 the signals $\pm(L_C \cos α + T_C \sin α)$. Of the four possible outputs from potentiometer 39 the output voltage $-(L_C \cos α + T_C \sin α) \cos β$ is taken. Similarly, output voltage $-V_C$ sin β is taken from potentiometer 40. These two voltages are summed by amplifier 53 which, in addition to changing the sign of the various terms thereof, also may be provided with a resistor-divider network, for example, or have its gain adjusted such that the output voltage $E_C$ is of a level sufficient for injection into the earth field bias circuit 17 of the MAD equipment 11, FIG. 1.

It should thus be apparent that the voltage $E_C$ is equal to $V_C \sin β + (L_C \cos α + T_C \sin α) \cos β$. This is Equation 1, above. In developing the above equations the subscript "H" was utilized because it was the earth's magnetic field $H_E$ that was the variable. Here, the subscripts "M" and "C" have been utilized as the variables have been the magnetometer voltages $T_M$, $L_M$, and $V_M$, derived from $H_E$, and the aircraft compensation voltages $T_C$, $L_C$, and $V_C$ also derived from $H_E$.

What is claimed is:

1. A magnetometer system borne in an aircraft comprising:

first sensing means responsive only to the magnetic field of the earth for providing a first output of three electrical signals representative of the magnitude of the respective transverse, longitudinal and vertical components of said field;

compensation means operatively connected to said first sensing means to receive said first output for producing a second output of three electrical signals representative of the magnitude of the respective transverse, longitudinal and vertical components of a disturbing magnetic field generated by the aircraft as it maneuvers;

direct function generating means operatively connected to said first sensing means and said compensating means to receive said first and second outputs for providing a third output of an electrical signal representative of the resultant magnetic field of the aircraft in the direction of the earth's magnetic field, including first term generating means responsive to the transverse and longitudinal components of said first output and producing first and second control signals, second term generating means responsive to said first control signal and the vertical component of said first output for producing a third control signal, third term generating means operatively connected to receive said second control signal and the transverse and longitudinal components of said second output for producing a fourth control signal, and fourth term generating means operatively connected to receive said third and fourth control signals and the vertical component of said second output for producing said third output;

first circuit means operatively connected to said direct function generating means to receive said third output for providing a fourth output of an electrical signal for canceling out the effects of the earth magnetic field combined with said third output; and second sensing means responsive to the combined magnetic fields of the earth, aircraft and an object target and operatively connected to said first circuit means to receive said fourth output for providing a fifth output of an electrical signal representative of the magnetic field of said object target field.

2. A magnetometer system according to claim 1 wherein said second sensing means comprises:

a magnetic core;

a first coil wound on said core and receiving said fourth output for inducing a compensating magnetic field in said magnetic core; and a second coil wound on said core for producing said fifth output.

3. A compensation system for use in a magnetometer system of an aircraft comprising:

first sensing means responsive only to the magnetic field of the earth for providing a first output of three electrical signals $T_M$, $L_M$ and $V_M$, representative of the magnitude of the respective transverse, longitudinal and vertical components of said field;

compensation means operatively connected to said first sensing means to receive said first output for producing a second output of three electrical signals $T_C$, $L_C$ and $V_C$ representative of the magnitude of the respective transverse, longitudinal and vertical components of a disturbing magnetic field generated by the aircraft as it maneuvers;

direct function generating means connected to receive said first output of three electrical signals and said second output of three electrical signals for providing a third output signal representative of the magnitude $$(L_C \cos \alpha + T_C \sin \alpha) \cos \beta + V_C \sin \beta,$$ wherein $\alpha$ is an angle that satisfies the equation $$L_M \sin \alpha - T_M \cos \alpha = 0$$

and $\beta$ is an angle that satisfies the equation $$V_M \cos \beta - (L_M \cos \alpha + T_M \sin \alpha) \sin \beta = 0$$

4. A compensation system as in claim 3 wherein said direct function generating means further comprises:

first composite signal generating means connected to receive said electrical signals $T_M$ and $L_M$ and for providing a fourth output signal representative of the magnitude of an angle $\alpha$ wherein said angle $\alpha$ satisfies the equation $$L_M \sin \alpha - T_M \cos \alpha = 0$$

and for further providing a fifth output signal representative of the magnitude $$L_M \cos \alpha + T_M \sin \alpha$$

second composite signal generating means connected to receive said fifth output signal and $V_M$ for providing a sixth output signal representative of the magnitude of an angle $\beta$ wherein said angle $\beta$ satisfies the equation $$V_M \cos \beta - (L_M \cos \alpha + T_M \sin \alpha) \sin \beta = 0$$

and third composite signal generating means connected to receive said second, fourth and sixth signals for providing said third output signal.

References Cited

UNITED STATES PATENTS

| | | | |
|---|---|---|---|
| 2,706,801 | 4/1955 | Tolles | 324—43 |
| 2,891,502 | 6/1959 | Cochran et al. | 324—43 |
| 3,133,244 | 5/1964 | Wojtulewicz | 324—43 |

OTHER REFERENCES

Jensen, H., The Airborne Magnetometer, Scientific American, June 1961, pp. 151–162.

RUDOLPH V. ROLINEC, Primary Examiner

R. J. CORCORAN, Assistant Examiner

U.S. Cl. X.R.

324—43